(12) United States Patent
Mangoubi et al.

(10) Patent No.: US 8,577,111 B2
(45) Date of Patent: Nov. 5, 2013

(54) SYSTEMS AND METHODS FOR SPATIO-TEMPORAL ANALYSIS

(71) Applicants: The Charles Stark Draper Laboratory, Inc., Cambridge, MA (US); Tufts Medical Center, Inc., Medford, MA (US)

(72) Inventors: Rami Mangoubi, Newton, MA (US); Mukund Desai, Needham, MA (US); Adel Malek, Wellesley, MA (US); Andrew Copeland, Cambridge, MA (US)

(73) Assignees: The Charles Stark Draper Laboratory, Inc., Cambridge, MA (US); Tufts Medical Center, Inc., Boston, MA (US)

( * ) Notice: Subject to any disclaimer, the term of this patent is extended or adjusted under 35 U.S.C. 154(b) by 0 days.

(21) Appl. No.: 13/788,668

(22) Filed: Mar. 7, 2013

(65) Prior Publication Data

US 2013/0207975 A1    Aug. 15, 2013

Related U.S. Application Data

(62) Division of application No. 11/946,155, filed on Nov. 28, 2007, now Pat. No. 8,411,914.

(60) Provisional application No. 60/861,588, filed on Nov. 28, 2006, provisional application No. 60/861,503, filed on Nov. 29, 2006.

(51) Int. Cl.
*G06K 9/80* (2006.01)

(52) U.S. Cl.
USPC ........... 382/128; 382/107; 382/130; 382/154; 382/276; 382/284

(58) Field of Classification Search
USPC .......... 250/107, 128, 130, 154, 276, 284, 285
See application file for complete search history.

(56) References Cited

U.S. PATENT DOCUMENTS

| | | | |
|---|---|---|---|
| 6,148,095 A * | 11/2000 | Prause et al. | 382/131 |
| 6,323,971 B1 * | 11/2001 | Klug | 359/24 |
| 6,664,956 B1 * | 12/2003 | Erdem | 345/419 |
| 7,113,631 B2 * | 9/2006 | Vaillant et al. | 382/154 |
| 2002/0123680 A1 * | 9/2002 | Vaillant et al. | 600/407 |
| 2003/0181809 A1 * | 9/2003 | Hall et al. | 600/425 |
| 2004/0082849 A1 * | 4/2004 | Schweikard et al. | 600/424 |
| 2006/0058647 A1 * | 3/2006 | Strommer et al. | 600/434 |
| 2006/0159363 A1 * | 7/2006 | Van De Haar et al. | 382/274 |
| 2007/0003016 A1 * | 1/2007 | Brunner et al. | 378/98.12 |
| 2007/0086675 A1 * | 4/2007 | Chinen et al. | 382/284 |
| 2007/0253610 A1 * | 11/2007 | Pieper et al. | 382/128 |

* cited by examiner

*Primary Examiner* — Michael Logie
(74) *Attorney, Agent, or Firm* — Foley & Lardner LLP; Edward A. Gordon

(57) ABSTRACT

High resolution time sequences of 3D images that show the dynamics of a time varying changes are provided. The 3D time series of images representing an object that include time varying changes may be produced from lower dimensional image time sequences, such as 2D images. The 2D images may be generated using angiography and may include fluid flow information (e.g., arrival times). The fluid flow information may be provided, for example, by injecting a chemical into the fluid and analyzing its position in the object or body over time. A varying contrast model may be applied to determine the location of the chemical at different points in time which may assist in detecting an ailment.

18 Claims, 13 Drawing Sheets

$$E(F,w,v) = \int_{\mathcal{M} x (0, t_{end})} \underbrace{[\alpha\beta([AF]-G)^2}_{520} + \underbrace{\beta(1-w)^2 \|\nabla_x F\|^2}_{530} + \underbrace{\beta(1-v)^2 \|\nabla_t F\|^2}_{540} +$$

$$\underbrace{\gamma|F|_1}_{550} + \underbrace{\frac{p}{2}\|\nabla_x w\|^2 + \frac{w^2}{2p} + \frac{p}{2}\|\nabla v\|^2 + \frac{v^2}{2p}}_{560}]dxdt$$

SYSTEMS AND METHODS FOR SPATIO-TEMPORAL ANALYSIS

CROSS-REFERENCE TO RELATED APPLICATION

This application is a divisional of U.S. patent application Ser. No. 11/946,155 filed Nov. 28, 2007 which claims the benefit of U.S. Provisional Application Nos. 60/861,588 filed Nov. 28, 2006 and 60/861,503 filed Nov. 29, 2006 all of which are hereby incorporated herein by reference in their entirety.

FIELD OF THE INVENTION

The present invention is directed to methods and apparatus for providing spatio-temporal analysis, and more particularly to producing an M-dimensional time-series of images, representing an object, that include time varying changes using lower dimensional images and an M-dimensional static map.

BACKGROUND OF THE INVENTION

Surgeons use three dimensional (3D) models as well as two dimensional (2D) images to aid in performing operations, especially in the brain region of a patient. The 3D models are generated from 2D high angular resolution projections which are created using an X-ray machine. The 2D images are generated using angiography.

The surgeon visually inspects the 2D images, which are obtained at different time intervals of the procedure, and determines whether a clot or some other ailment occurs or exists. The surgeon mentally maps the ailment detected in the 2D images to the 3D model and determines an estimate of the location of the ailment. Such visual inspections and/or mental mapping may be unreliable and highly dependent on the experience and skill of the operator. In addition, frequent updates of the 3D model using conventional techniques would require exposing the patient to an unacceptable amount of X-ray radiation.

Accordingly, it is desirable to provide enhanced methods and apparatus for analyzing changes in an object or body using 3D image information based on 2D image information.

SUMMARY OF THE INVENTION

In accordance with the principles of the present invention, methods and apparatus are provided for providing spatio-temporal analysis.

High resolution time sequences of 3D images that show the dynamics of a fluid flow, for example, blood flow, may provide enhanced methods for diagnosing changes in an object or body. Such analysis may particularly be useful in the realm of cerebral angiography. These sequences of 3D images may allow image feedback during medical procedures that facilitate the detection and observation of stenosis, aneurysms, clots, or any other type of ailment or anomaly that may be present. The sequences of 3D images also may enable offline computational fluid dynamic models of fluid flow to further detect anomalies or ailments in the object or body.

In some embodiments, a 3D time series of images representing an object that include time varying changes are produced from sequences of lower dimensional images, such as 2D images. In one aspect of the invention, the 2D images are generated using angiography and may include fluid flow information (e.g., arrival times) or some other movement information. In other aspects of the invention, the 2D images may be generated using radiography, X-rays, or other suitable methods of acquiring 2D images that include movement information without departing from the scope and spirit of the invention. The fluid flow information may be provided, for example, by injecting a chemical into the fluid and analyzing its position in the object or body over time. For example, a varying contrast model may be applied to determine the location of the chemical through the object or body at various points in time.

A first plurality of 2D images that include indicia of fluid flow or time varying changes are received. The 2D images are fused with a 3D model to produce the time series of 3D images that include the indicia of the time varying changes, such as fluid flow. The 3D model acts as a map to ensure the proper projection of the 2D images and is used to produce the time series of 3D images.

In some embodiments, 2D images that include fluid flow information may be collapsed into a single 2D image to assist in detecting ailments or anomalies. For example, a modified Cusum algorithm may be used to generate the collapsed 2D image. The modified Cusum algorithm is robust to the wide variations that may exist in the shape of the 2D time series across different locations. The Cusum algorithm is modified in two ways to generate the single 2D image. First, the Cusum algorithm is modified by adding a second threshold that allows the algorithm to find a more precise fluid flow location (e.g., arrival time) without introducing a high false alarm rate. The second modification is the inclusion of a noise estimate that depends on intensity of the fluid flow or movement information. This approach more accurately captures the characteristics of noise that may be present in the angiographic 2D time sequence.

In some embodiments, a single 2D image may be projected from the 3D time series of images constructed using the 2D images. This obviates the need to use the modified Cusum algorithm to generate the image. The single 2D projection includes fluid flow information and also enables the detection of ailments.

BRIEF DESCRIPTION OF THE DRAWINGS

The above and other features of the present invention, its nature and various advantages will be more apparent upon consideration of the following detailed description, taken in conjunction with the accompanying drawings in which:

FIG. 5 is a diagram of an exemplary function used to perform spatio-temporal data fusion in accordance with an embodiment of the present invention;

DETAILED DESCRIPTION

This invention generally relates to constructing M-dimensional images from N-dimensional images, wherein N is less than M, by combining the N-dimensional images with an M-dimensional static map. For illustrative purposes, this invention will be described in the realm of surgery and in particular brain surgery where the N-dimensional images are 2D images and the M-dimensional static map is a 3D constraints map. Examples of using this technique using higher dimensional images (e.g., where N=3 and M=4) are provided below after the description of FIG. 11.

Figure 1:
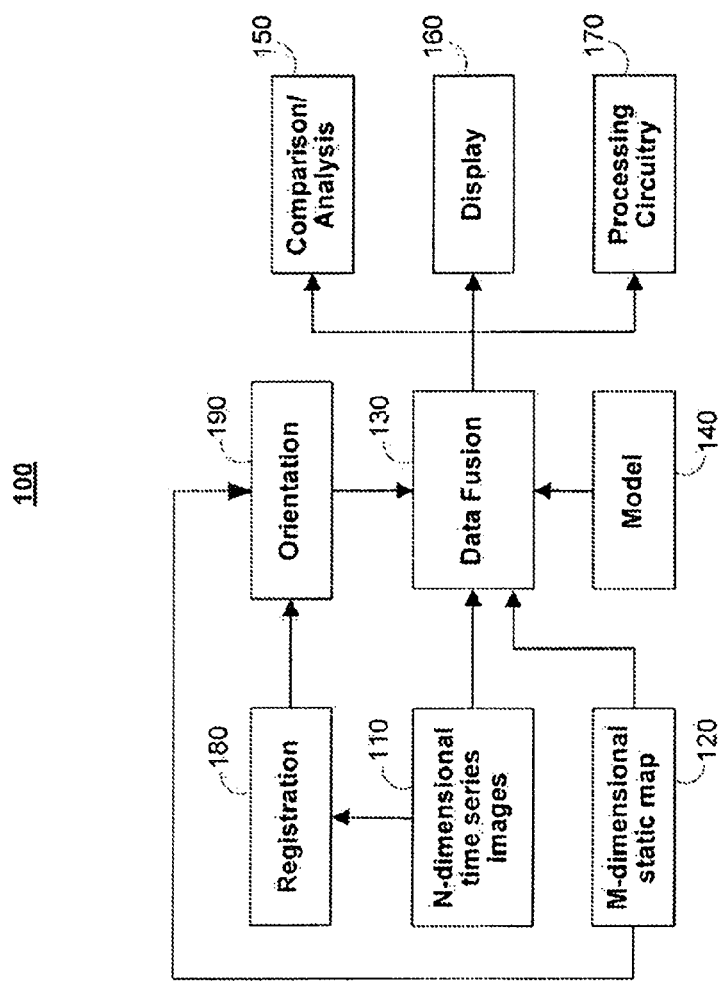
FIG. 1 is a diagram of an illustrative data fusion process in accordance with an embodiment of the present invention.

FIG. 1 is a diagram of an illustrative data fusion process 100 in accordance with an embodiment of the present invention. In data fusion process 100, N-dimensional data provided by N-dimensional time series images 110 is combined with M-dimensional data provided by M-dimensional static map 120 at data fusion process 130. As defined herein, the term "time series images" is a series of images captured or received over a period of time. The static 3D map 120 is sometimes referred to as a constraints map. N-dimensional time series images 110 are registered using registration process 180 which is described in more detail in connection with FIG. 3 below. N-dimensional time series images 110 are also oriented relative to M-dimensional static map 120 using orientation process 190 which is described in more detail below in connection with 2D-3D registration. When the 2D images are combined with the 3D map by data fusion process 130, a time varying 3D map is generated. This is referred to as 3D+t time series images below. For purposes of illustration, this technique will be described in the context of brain-surgery or neuro-surgery where the N-dimensional data is 2D images that include fluid flow while M-dimensional data is a 3D static map of the brain or region of interest. However, as discussed in more detail below, the teachings of this invention may be applied in other contexts such as circuitry, mechanical models or other systems that include dynamic changes without departing from the scope and spirit of the invention. It should be understood that the processes described above and below can be executed by computer instructions stored on computer readable medium or hardware modules. The processes can also be combined into separate modules that execute computer instructions, implement hardware or both.

M-dimensional images may be formed from the N-dimensional data but the resulting M-dimensional images may contain ambiguities due to the lack of information. Combining the N-dimensional data with M-dimensional static map 120 removes such ambiguities (e.g., ghosts) or other errors from the 3D+t time series by restricting the N-dimensional images to only regions that are present in the object.

2D time series images 110 may be generated by using a capturing device that creates an 2D representation of a selected region. For example, 2D time series images 110 may be generated by using angiography, radiography, ultrasound or some other form of X-ray imager. 2D time series images 110 include additional information associated with movement in time, such as fluid flow. The movement information is represented by the location of a contrast agent (in the blood stream) present in each of the images in the series. By comparing subsequent images in the series and analyzing the progression of the contrast agent in the images of the series one can determine movement information of the blood stream. In some embodiments, the additional information may be represented by in some other form that can be analyzed to determine movement without departing from the scope and spirit of the invention.

Prior to fusing the 2D time series with the 3D static map, 2D time series images 110 are aligned to one another in a process referred to as registration. Registration results in better fusion by reducing artifacts resulting from movements of the imaged region that occur during image capture. Registration of 2D time series images will be described in more detail below in connection with FIG. 3.

The 3D static map 120 is generated in steady state by reconstructing X-rays, ultrasound images, or other images which may be taken from, for example, more than a hundred different perspectives. The same or a different imager used to create the 2D time series images 110 may be used to generate 3D static map 120. Alternatively, as described in more detail below, a 3D static map 120 previously generated in relation to a different person may be used or retrieved from storage.

Model 140 is used to interpret the information generated by the combination of the N-dimensional data and M-dimensional static map Model 140, for example, provides information on how blood flows through a brain, or the blood's spatio-temporal dynamics. In other applications, model 140 provides other information such as dynamic heat flow in a mechanical system or current flow in an electrical circuit. Model 140 may also provide object or patient specific information to assist data fusion process 130 to combine N-dimensional time series images 110 with M-dimensional static map 120. Model 140 also provides the dependency sensor model that describes the theoretical relationship between the higher dimensional phenomena to be reconstructed and the lower dimensional set of measurements. Model 140 is described further in connection with the data fidelity element 520 (FIG. 5).

Data fusion process 130 receives the N-dimensional time series images 110, the M-dimensional static map 120, and a model 140 as its data inputs. In some embodiments, data fusion process 130 may also receive additional sets of N-dimensional time series images 110 (not shown). In such implementations, each set of N-dimensional time series images 110 represents a different region of the object or patient. For example, each set may be taken at a different axis and thereby provides different information about the object or patient. In one implementation, two sets of 2D time series images are used where the first set is taken along a first axis and the second set is taken at an axis perpendicular to the first axis. The greater the number of sets of N-dimensional time series images 110 that are used, the more information that is provided in the resulting 3D+t series of images. Data fusion process 130 will be described in more detail in connection with FIGS. 4-6.

As discussed in more detail below in connection with FIG. 11, the output of data fusion process 130 may be further analyzed or compared 150 with previous patient information or a patient population to detect ailments or other anomalies which may not be readily apparent. Processing circuitry 170 performs various algorithms on the fused data output to detect ailments or anomalies. The output of the data fusion process 130, the comparison analysis process 150, and processing circuitry 130 may also be displayed on a display device 160 for analysis by a human or surgeon.

Figure 2:
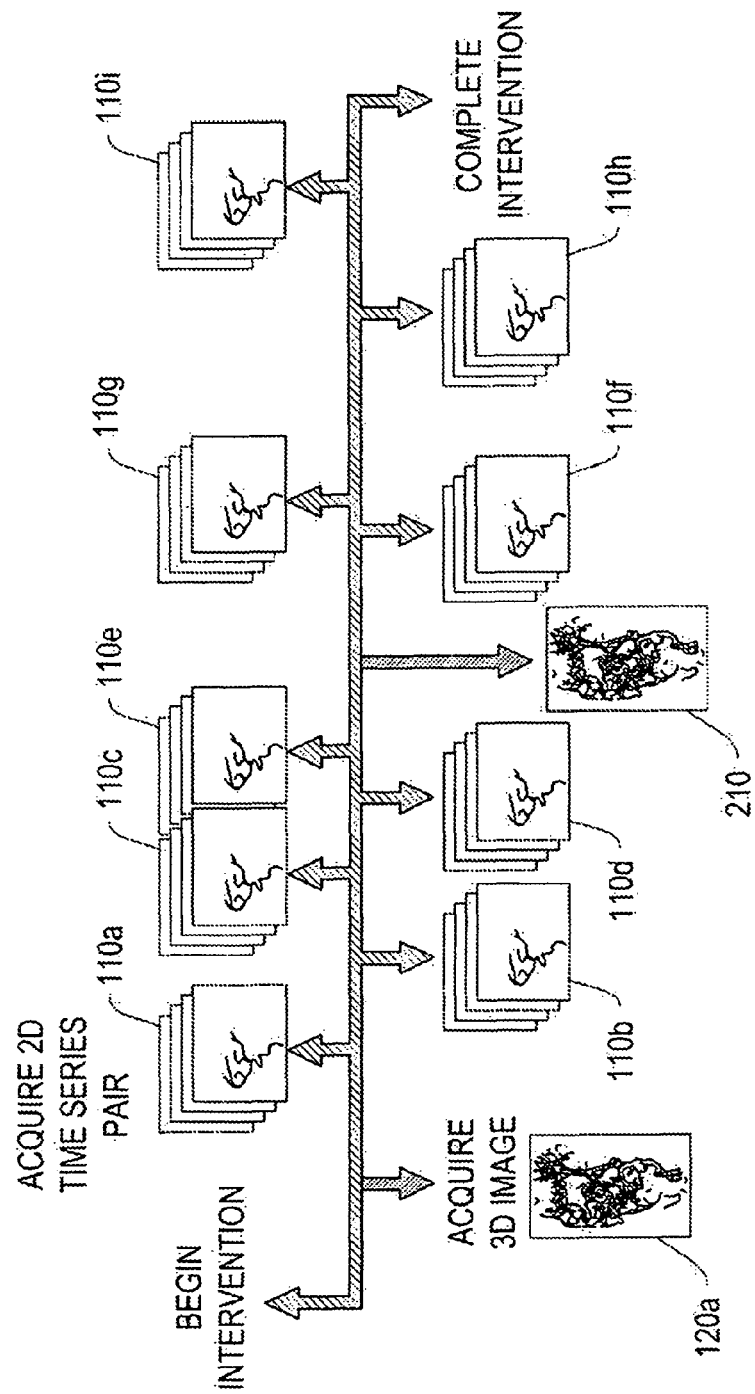
FIG. 2 is a diagram of an illustrative application of an intervention process that may be performed in accordance with an embodiment of the present invention.

FIG. 2 is a diagram of an illustrative application of an intervention process 200 that may be performed in accordance with an embodiment of the present invention in the context of brain surgery. Intervention process 200 is illustrated as a timeline of the procedure. Intervention process 200 begins with the acquisition of a 3D image representation 120a of the brain or a region of the brain of a patient. The 3D image representation 120a is generated by taking a large number of X-rays at multiple perspectives of the region of interest. The images are then be combined and formed into a single 3D image representation 120a (referred to as a 3D static map or constraints map). In some embodiments, the 3D image representation 120a may correspond to a different patient's brain in lieu of generating a new 3D image. This is possible because brains do not vary substantially between patients.

The surgeon injects a chemical (e.g., contrast agent) into the blood stream of the patient. The chemical is used to detect the flow of blood by analyzing the time it takes the chemical to reach different locations in the blood vessels of the brain. Periodically, 2D images are captured to form 2D time series images 110a. It should be noted that the chemical is injected each time to form each set of 2D time series images 110a-i. At some later time, the surgeon injects the chemical once again and acquires another set of 2D time series images 110b. 2D time series images 110b represent another region or the same region as 2D time series images 110a. Additional sets of 2D time series images 110c-e may be acquired before all of the images are fused with 3D image representation 120a.

The 2D time series images 110a-e are fused with 3D image representation 120a to produce a 3D+t time series images 210. 3D+t time series images 210 enables the surgeon to see the brain in 3D along with the blood flow information. For example, each 3D image in the 3D+t time series shows the state of the injected contrast agent as it progresses through the brain. By seeing the contrast agent in the 3D time series one can visualize the flow of blood through the brain and detect anomalies. In particular, the blood flow information from each of the 2D time series images 110a-e is projected in the 3D image representation 120a. This enables the surgeon to detect clots or anomalies in regions that may be adjacent to or in some other region which the surgeon may have not taken 2D time series images 110a-e.

After 3D+t time series images 210 have been produced and analyzed or displayed, further 2D time series images 110f-i may be acquired. 2D time series images 110f-i may correspond to the same region of interest as 2D time series images 110a-e thus allowing the surgeon to examine blood flow differences in a particular area at different points in the surgery. Alternatively, 2D time series images 110f-i may correspond to a different region of interest than 2D time series images 110a-e allowing the surgeon to examine blood flow in an unexplored region or for a region which the surgeon requires more data. For example, after the surgeon analyzes the 3D+t time series images 210, the surgeon may be interested in seeing the effects of fluid flow or movement in a different region. Thus, 2D time series images 110f-i are acquired and fused with 3D image representation 120a to produce another 3D+t time series images 210 representing a new region of interest. Thereafter, the surgery or operation is completed.

It should be understood that although process 200 shows multiple sets of 2D time series images 110a-e being acquired before fusion, it may be desirable to only fuse one set of 2D time series images 110a with 3D image representation 120a.

In order to improve the 3D+t time series images that are generated at each step of the intervention, the 2D time series images are aligned. Aligning the 2D time series images compensates for patient movements that may occur during the intervention process. The aligning of the 2D time series images is referred to as registration. In particular, the registration process, discussed below in connection with FIG. 3, initially takes two images from the 2D time series and finds the median or mean between the two images. It then cycles through all of the remaining images in the 2D time series to align each of the remaining images relative to the median or mean. It also continuously updates the median or mean that is used for the aligning of the images.

Figure 3:
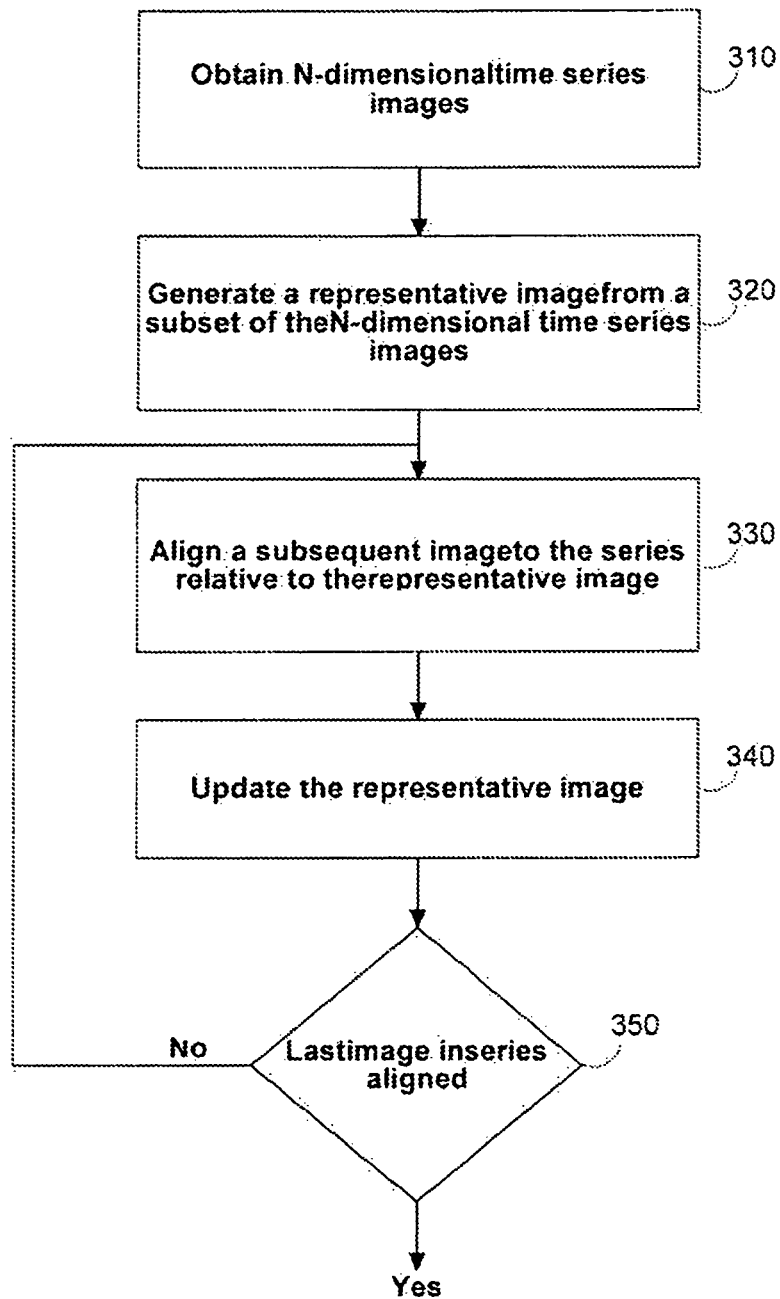
FIG. 3 is a diagram of an illustrative process for registering N-dimensional data in accordance with an embodiment of the present invention.

FIG. 3 is a diagram of an illustrative process 300 for registering N-dimensional data in accordance with an embodiment of the present invention. The process for registering the N-dimensional data is referred to as recursive once-through sweep algorithm. Although the implementation discussed below uses the recursive once-through sweep algorithm to register a set of images, it should be understood that any other type of algorithm that aligns a set of images can be used without departing from the scope of the invention. Registration process 300 begins at step 310 where a set of N-dimensional time series of images is obtained. As discussed above, these images may be acquired by angiography or X-ray or any other suitable process. The images include movement information.

At step 320, a representative image is generated from a subset of the N-dimensional time series images. This image is referred to above and below as the median or mean value or image. This value represents an alignment between two or more images and acts as a point of reference for other images in the series to be aligned. Thus, the remaining images can be aligned relative to the median or mean value. In particular, at step 330, a subsequent image in the image series is aligned relative to the representative image.

At step 340, the representative image or value is updated. For example, after the subsequent image is aligned it may be determined that the mean or median value is offset. Accordingly, it may be necessary to change the value to act as a new point of reference for subsequent images. In particular, at step 350, if there is another image left in the series, the image is aligned at step 330 relative to the new representative image value. Otherwise, at step 350, the process completes and outputs a registered set of N-dimensional time series images.

As discussed above the recursive once-through sweep algorithm begins on a set of unregistered N-dimensional time series images by first registering a pair of images with respect to one another and then generating a representative image of that pair. The representative image may be a mean image, a median image, or a minimum entropy image. Subsequently, the next of the unregistered images in the set is registered with the representative image. Once registered, the image may be added appropriately to a set of registered images and a new representative image is found. This process repeats until all of the unregistered images of N-dimensional time series images 110 have been registered.

In one implementation, the determination of a representative image or value is calculated in accordance with the following equation:

$$\overline{T}_n = \underset{T_n}{\mathrm{argmin}} \sum_{\substack{j=1 \\ j \neq n}}^{N_{im}} \sum_{i=1}^{L} \frac{[I_j(\overline{T}_j(x_i)) - (I_n(T_n(x_i))]^2}{N_{im} - 1}$$

where $N_{im}$, is the number of images and L is the number of pixels in an image. The equation receives as its input a first image ($I_n$) of N-dimensional time series images 110. The transformation $T_n$ associated with image In is solved for iteratively separately while fixing each $\overline{T}_j$ from the most recent iteration for j≠n. The bar denotes that the value of $T_j$ is fixed to the optimal value obtained in an earlier iteration. $x_i$ denotes the location of a particular pixel in the image. To start the algorithm, each of the $T_j$'s is initialized to the Identity operator. The algorithm continues by sequentially solving the equation in a loop across each of the images until convergence to a local minimum. The result is an algorithm that registers one image versus all other images. This process is a least squares analogy to the iterative gradient descent process used to align images under the entropy metric known as "congealing." This equation is described in greater detail in S. Zokai and G. Wolberg, Image registration using log-polar mappings for recovery of large-scale similarity and projective transformations, *IEEE Transactions on Image Processing*, 14(10), pages 1422-1434, October 2005, which is incorporated by reference herein in its entirety.

The alignment of the $n^{th}$ image in the sequence is found by solving for the $T_n$ that minimizes the following equation:

$$\overline{T}_n = \underset{T_n}{\mathrm{argmin}} \sum_{i=1}^{L} [I_n(T_n(x_i)) - \overline{\mu}_{n-1}(x_i)]^2$$

where $\overline{\mu}_n(x_i)$ is calculated recursively using the following relation:

$$\overline{\mu}_n(x_i) = \frac{(n-1)\overline{\mu}_{n-1}(x_i) + I_n(T_n(x_i))}{n}$$

In some embodiments, it may be desirable to find the relative orientation of 2D time series images 110 to the 3D static map 120. This orientation will be referred to herein as 2D-3D registration. The time between acquisition of 3D static map 120 and the formation of a 3D+t map is substantially longer than the time between the acquisition of individual 2D images in the 2D time series images 110. In particular, the a 3D image may be formed only every few minutes while a single set of 2D time series images may take on the order of seconds. Because of this order of magnitude in time differences between the acquisition of the 2D and formation of 3D images, there is a greater likelihood of patient motion. Thus, it may be necessary to orient the 2D images relative to the 3D images by performing 2D-3D registration to provide an improved 3D+t time series image representation. The relative orientation is found by finding the projection of the volume, known as a digital reconstructed radiograph (DRR), that is most similar to a representative image of the registered time series. A projection of a triangular mesh representation of 3D static map 120 is obtained.

The DRR is generated by first producing a mesh Vmesh using the Marching Cubes algorithm on the segmented data. The Marching Cubes algorithm is described in greater detail in W. E. Lorensen and H. E. Cline. Marching cubes: A high resolution 3D surface construction algorithm. In *SIGGRAPH '87: Proceedings of the 14th annual conference on Computer graphics and interactive techniques*, pages 163-169, New York, N.Y., USA, 1987. ACM Press, which is incorporated by reference herein in its entirety. This creates a collection of points that combine to form a surface that is inherently sparse in size compared to M-dimensional static map 120 or 3D volume. Each point in the mesh can then be projected. After the mesh is projected into the imaging plane, the pixel locations within each triangle is set to the value one.

The meshed volume $S_{mesh}$ is a collection of vertices $v_i=(x_i, y_i, z_i)^T$ representing points in space and triangles $Triag_j=\{j_1, j_2, j_3\}$ containing triplets of vertex indices. A transformation $T_3$ is applied only to the list of vertices as it may not affect the connectedness of the individual triangles. The transformation $T_3$ is a function of three rotations about the x, y, and z axes in the volume reference frame; three shifts in the $\hat{x}$, $\hat{y}$, and $\hat{z}$ directions in the volume reference frame; and two shifts in the 2D image reference frame. A general expression for the transformation $T_3$ is $x_p=P(Rv_i+dv)+dx$ where P represents the projection of the 3D coordinates into the 2D imaging plane, R is a rotation matrix, dv is the shift in the volume reference frame, and dx is the shift in the imaging reference frame. To apply the function P on the shifted and rotated vertices it may be necessary to know both the geometries of the X-Ray image (preferably a point source conebeam setup) and the spatial resolutions of the 3D map. This information completes the set of information used to construct the DRR.

The 2D-3D registration process can be described as the search for $$\overline{T3} = \underset{T3}{\mathrm{argmax}} \rho(I_{DRR}[x_p; S_{MESH}; T3], I_{vasc}[x_p]),$$

where ρ is the correlation $$\rho(I_1, I_2) = \frac{\sum_i (I_1(x_i) = \mu_{I_1})(I_2(x_i) - \mu_{I_2})}{\sigma_{I_1} \sigma_{I_2}}$$

between the two images. The variables μ and ρ are the mean and variance respectively of the subscripted image, in this case it is either $I_1$ or $I_2$. The binary DRR can be thought of as a labeling or segmentation of the vasculature image. By varying T3, one varies the labeling. Since registration process involves projection of a shell or mesh, using the binary DRR instead of a DRR with a continuum of values may simplify computations. The correlation metric provides a good measure of the quality of the segmentation.

The search begins by performing a search in the range of variables. For example, eight variables may be solved for separately using, for example, Brent's method. Brent's method is described in more detail in R. P. Brent. *Algorithms for Minimization without Derivatives*. Prentice-Hall, Englewood Cliffs, N.J., 1973, which is hereby incorporated by reference herein in its entirety. The process repeats by looping through each parameter, finding the most suitable choice, updating, then continuing. The algorithm greatly improves the match between the DRR and the time series of images and find the most suitable orientation information which may be used in the fusion process.

Figure 4:
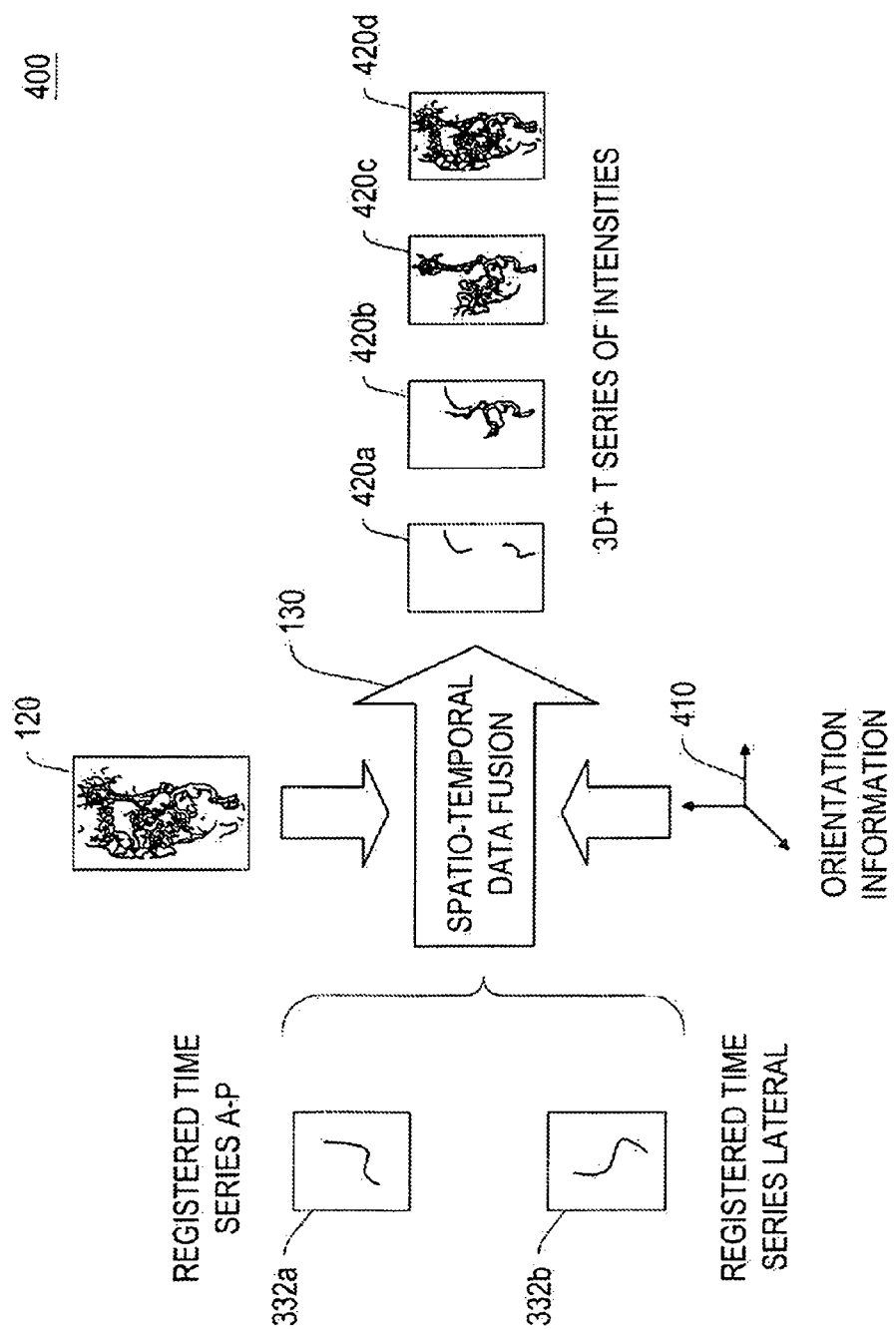
FIG. 4 is a diagram of an illustrative implementation of spatio-temporal data fusion in accordance with an embodiment of the present invention.

FIG. 4 is a diagram of an illustrative implementation of spatio-temporal data fusion 400 in accordance with an embodiment of the present invention. In particular, FIG. 4 shows the implementation of spatio-temporal data fusion in the context of brain or neuro surgery. Spatio-temporal data fusion 400 includes the receipt of one or more registered N-dimensional time series 332a and 332b (e.g., 2D angiograms taken of an area of the brain at different points in time), an M-dimensional static map 120 (e.g., 3D constraints map of the patient's brain), orientation information 410 (discussed above as 2D-3D registration) and spatio-temporal data fusion process 130. Spatio-temporal data fusion 400 is the process of combining spatial and temporal constraints to produce a time series of M-dimensional (e.g., 3D) spatial data. Spatio-temporal data fusion process 130 implements function 500 (FIG. 5 described in more detail below) and outputs 3D+t time series as outputs 420a-d. In some embodiments spatiotemporal data fusion may be used to reconstruct a 3D time series that shows the flow of blood or some other movement during a medical procedure, for example, surgery. The output 420a-d of spatio-temporal data fusion process 130 may be stored in a memory, analyzed or displayed.

Outputs 420a-d show the flow of the blood or liquid through the vessels of 3D map 120. For example, output 420a shows the flow of blood or liquid at one point in time and outputs 420b-d show the flow of blood or liquid at later points in time. The flow information is provided with 2D time series 332a-b and applied to 3D map 120 to produce output 420a-d. The 3D time series outputs 420a-d provides additional information that may not be observable in 2D time series 332a that include fluid flow or movement information.

FIG. 5 is a diagram of an exemplary function 500 used to perform spatio-temporal data fusion in accordance with an embodiment of the present invention. Function 500 is implemented by data fusion process 130 (FIG. 1). The function 500 is an energy function that includes the following arguments, a data fidelity element 520, a spatial smoothness element 530, a temporal smoothness element 540, a sparsity term 550, an edge penalty term 560 and constraints map element 570. The most suitable of 3D time series of images is found by projecting the 2D time series images 110 onto the 3D static map 120 in a way that minimizes the energy function 500. More generally, function 500 integrates an N-dimensional time series over an M-dimensional constraints map 570. M-dimensional constraints map 570 reduces the presence of artifacts or ghost objects (e.g., non-existent objects that may appear from improper projection of N-dimensional time series to M-dimensional images). Element 520 of function 500 provides data fidelity. Data fidelity is provided between registered data G and projection of reconstruction AF, after back projection B. Alpha is a weight. Element 530 of function 500 provides spatial smoothness in the projected image. Spatial smoothing term 530 uses the gradient of reconstruction F whenever the processing is not at a spatial edge which is indicated by w. Beta β in spatial smoothing term 530 is a weight. Element 540 of function 500 provides temporal smoothness in the projected image. Temporal smoothing uses the gradient of reconstruction F whenever the processing is not at a temporal edge which is indicated by v. Beta β in spatial smoothing term 540 is the same weight that is provided in spatial smoothing term 530. Term 550 is a sparsity term. The sparsity term insures compact reconstruction, where 1-norm of F is used to enhance compactness. Element 560 of function 500 is an edge penalty term that prevents undesired edges from appearing in the projected image. Element 560 includes a spatial smoothness of an edge term, a penalty term for a spatial edge, temporal smoothness of an edge term and a penalty term for a temporal edge. As stated above, in function 500, variable G is the registered measured 2D times series, F is the reconstructed 3D time series, w is the spatial edge term, and v is the temporal edge term. The remaining Greek characters are weights used to impose the different terms described above.

The temporal smoothness constraint 540 provides an implicit fluid flow model. This model smoothes the intensities through time by offsetting discontinuities in the flow. The set of discontinuities are penalized to be smoothly varying in space and time using the constraint in term 540 along with the spatial smoothness term 530.

Figure 6A:
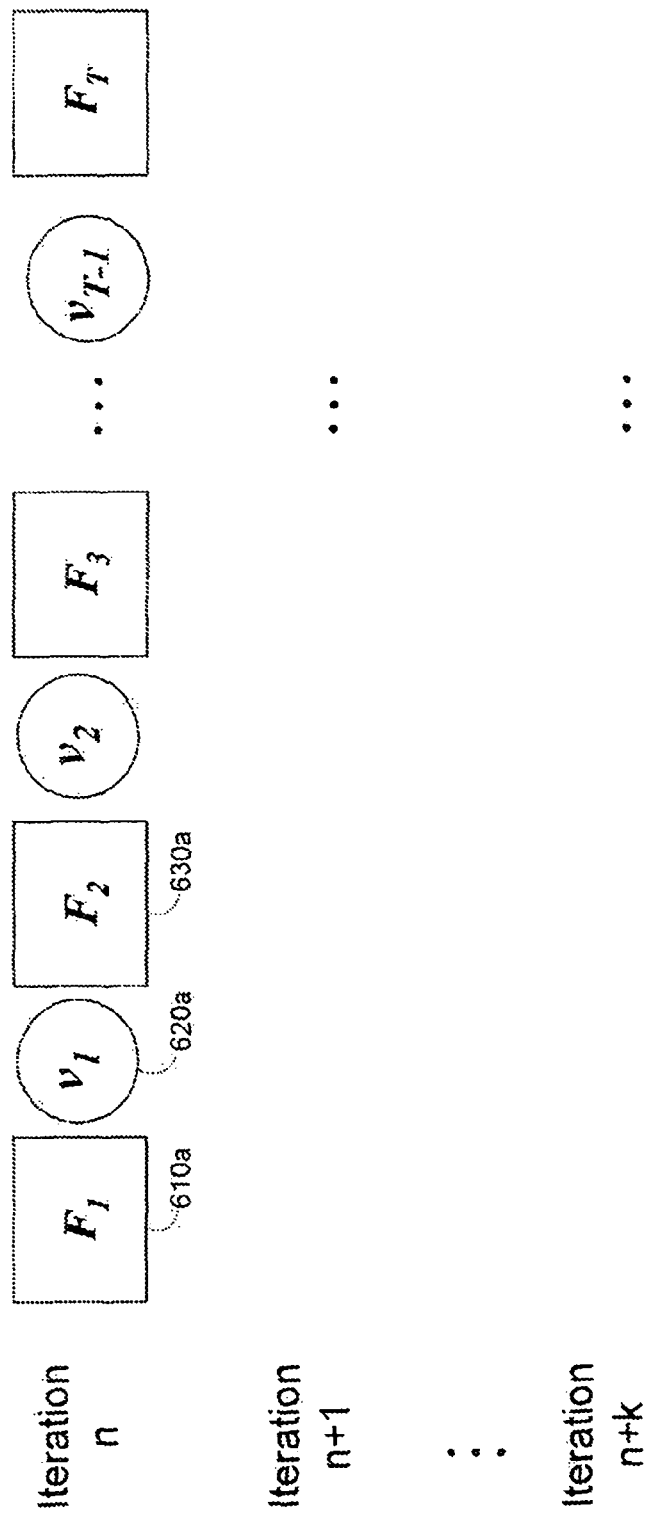
FIGS. 6a-c are diagrams illustrating exemplary processing of a function implementing spatio-temporal data fusion in accordance with an embodiment of the present invention.
Figure 6B:
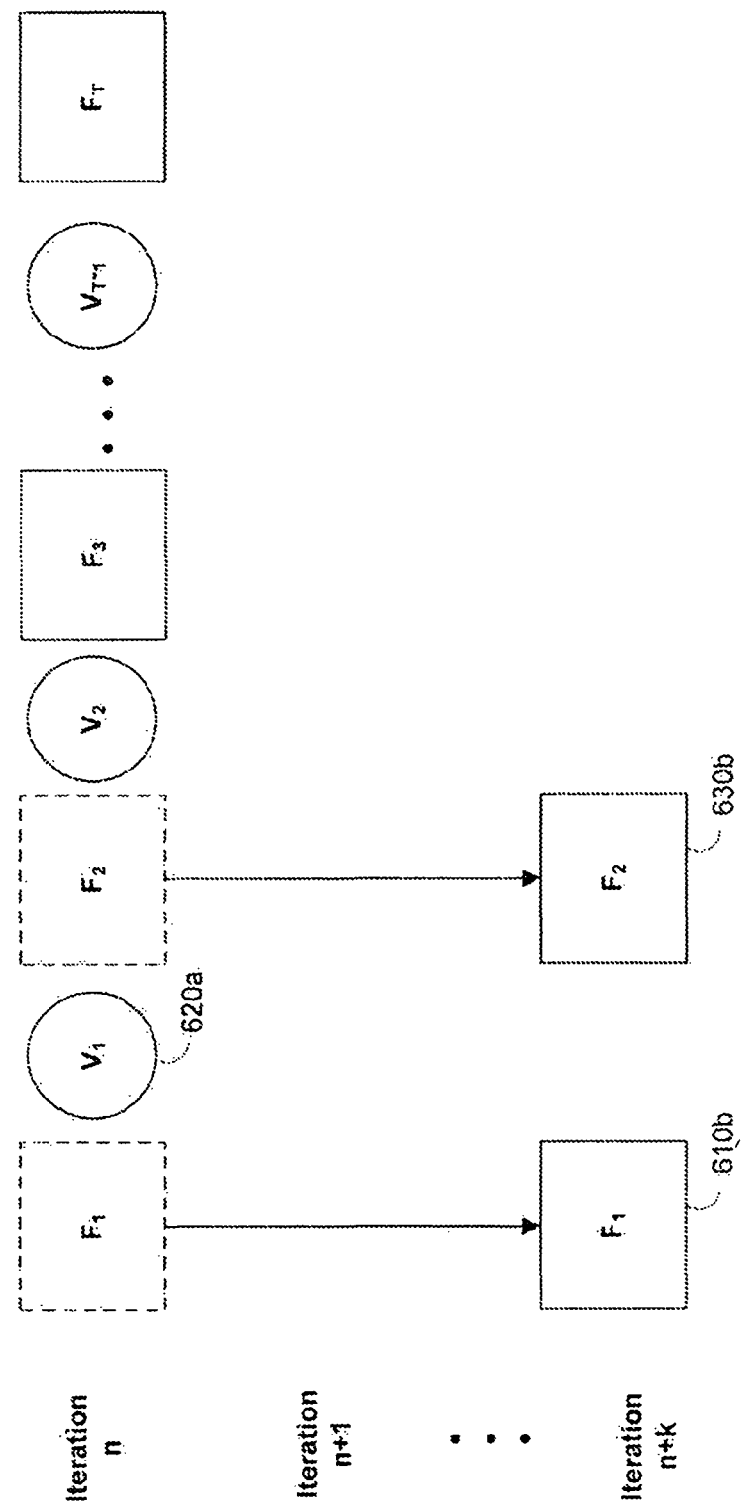
Figure 6C:
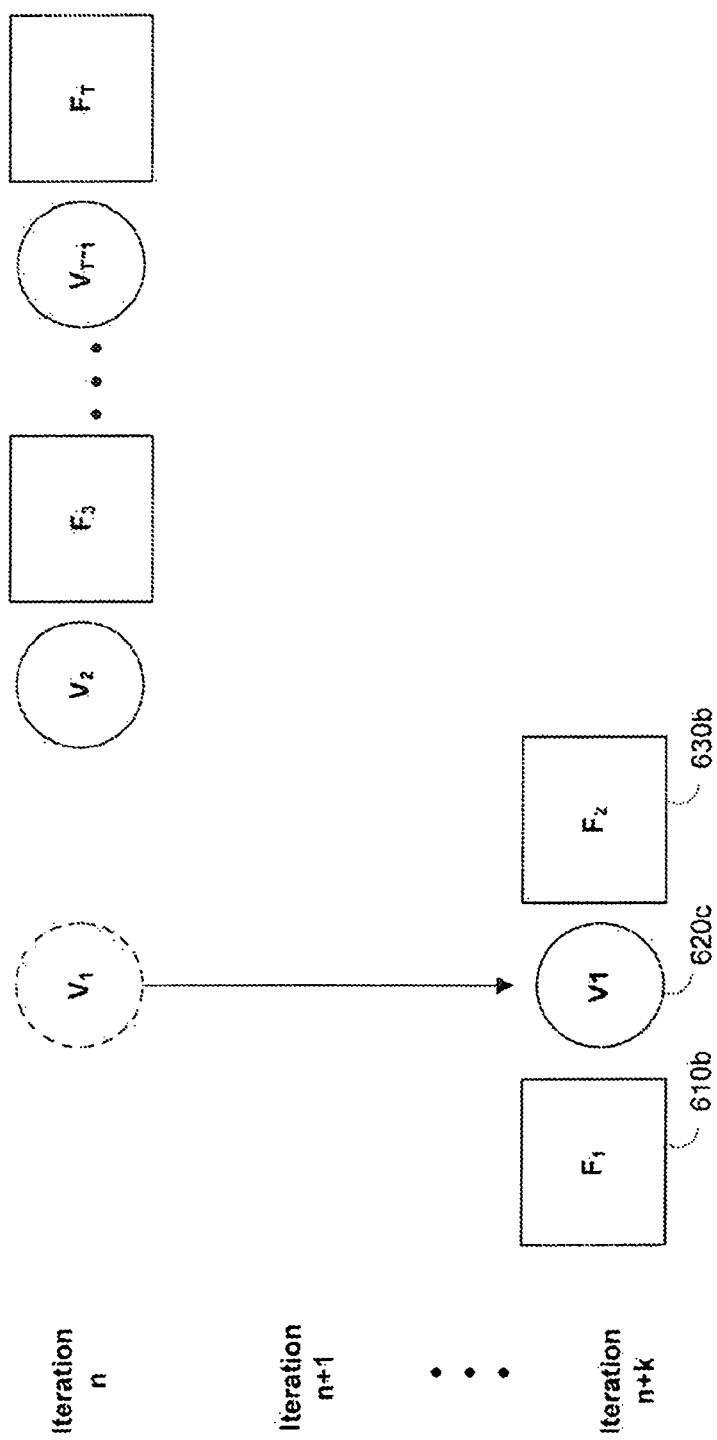

In order to make the processing of function 500 more efficient, a Gauss-Seidel-type method is used to compute the output of function 500. In particular, the individual computations of function 500 are decoupled to reduce the amount of memory required for solving the function. FIGS. 6a-c illustrate the way in which the computations are decoupled at various iterations of the algorithm.

FIGS. 6a-c are diagrams illustrating exemplary Gauss-Seidel-type processing of function 500 implementing spatio-temporal data fusion in accordance with an embodiment of the present invention. The Gauss-Seidel-type method alternates between solving for reconstructions at individual times and solving for the time coupling term. This reduces the amount of memory that is required to solve function 500 and increases the efficiency of the overall system. In an alternative implementation a Jacobi-type descent may be used without departing from the scope and spirit of the invention. The Gauss-Seidel-type method and the Jacobi-type descent are described in more detail in W. F. Ames, *Numerical Methods for Partial Differential Equations*, Computer Science and Applied Mathematics, Academic Press, 2nd edition, 1977, which is hereby incorporated by reference herein in its entirety.

The method of processing function 500 shown in FIGS. 6a-c results in a sequential algorithm that first performs a single iteration of the reconstruction of volume parameter F 610a of function 500 and edge function parameter w of function 500 at time one. Next, the new values of F 610b (FIG. 6b) and w for time one may be saved over the previous values. The process continues for the reconstruction of volume 630a at time two with a single iteration of the reconstruction of F 630b and w that is saved at completion. Subsequently, a single iteration is performed of the reconstruction of parameter v 620a of function 500 at time 1.5 and saved at completion. After v 620c is determined, the values F 610b and 630b and w at time three are moved forward an iteration and saved. The algorithm then returns to determining v 620c at time 2.5. When the end of the time series is reached, the algorithm returns to the beginning of the time series.

The process shown in FIGS. 6a-c allows the edge term v to be calculated at iteration (k) after the kth iteration of F has been determined at the adjacent times. As with F, only the most recent iterations for the two adjacent times of F and w are required to determine v. The Gauss-Seidel type algorithm provides an in-place algorithm for finding the reconstruction of F, w, and v at each time. This process may be extended to further decouple the determination of v at each time. This process decouples the individual 3D reconstructions from the smoothing of each spatial location across time.

In some embodiments, it may be desirable to form a single N-dimensional image from N-dimensional time series images 110. For example, a single 2D image can be formed, from 2D time series images, that includes fluid flow information that can be extracted from the series of images. Such an image enables the surgeon to detect anomalies in 2D form and provides an alternative to performing the data fusion process 130 to generate 3D+t time series images. For example, each of the 2D time series images contains movement information for a different point in time. The movement information in each of the images is provided by the contrast agent that is injected into the bloodstream of the patient. The movement information can be extracted by comparing the progress of the contrast agent through the brain in subsequent images. The movement information present in each of the 2D times series images can then be collapsed (or combined) into a single image. The single 2D image may represent the movement information from the subset of 2D time series images by, for example, varying the intensity (i.e., lightness or darkness) of the pixels in a particular region. This allows, for example, surgeons to more easily observe delays in the contrast agent at different locations in a region, enabling them to quickly diagnose the presence of an anomaly. It should be understood that the single N-dimensional image may be input to data fusion process 130 (FIG. 1) and used to perform spatio-temporal data fusion (as discussed above) or may be analyzed independently to detect anomalies.

The single N-dimensional image is constructed from N-dimensional time series images 110 in accordance with a modified Cusum algorithm. The Cusum algorithm is described in more detail in A. Wald, *Sequential Analysis*, Wiley, New York, 1947, which is hereby incorporated by reference herein in its entirety. The Cusum algorithm is used because it is robust to the wide variations that may exist in the shape of N-dimensional time series images 110 across different locations.

To make the Cusum algorithm capable of detecting arrival times of the contrast agent (i.e., the location of the contrast agent in time) it is modified in two new ways. First, it is modified by adding a second threshold that allows the algorithm to find a more precise arrival time without introducing a high false alarm rate. The second modification is the inclusion of a noise estimate that depends on intensity. This approach more accurately captures the characteristics of the Charged Coupled Device (CCD) noise present in, for example, the angiographic time sequence and thereby provides movement information in the collapsed image.

The modified Cusum algorithm is then used to assign arrival times to the contrast agent present in the image by determining when a particular threshold (as discussed below) is reached. In particular, after a contrast agent in the image is detected, when the higher threshold is triggered, the algorithm steps back in time until it reaches the time immediately after it crossed a second lower threshold. The time the intensity goes above the lower threshold is the arrival time assigned to a point in the N-dimensional constructed image.

The modified Cusum algorithm works by thresholding an indicator function $h_n[x_i]$ $$h_n[x_i] = \left[ h_{n-1}[x_i] - \frac{I_n[\overline{T}_n(x_i)] - \mu_{n-1}[x_i]}{q(\mu_{n-1}[x_i])} - T \right]^+$$

where $I_n[\overline{T}_n(x_i)]$ is the registered time series 332 (FIG. 3) and q is a function representing the noise level at a point. The addition of the intensity based noise level to the Cusum algorithm makes the resultant algorithm adaptive. Noise levels in the image are determined by generating a joint histogram between the first two registered images (FIG. 3). These images are chosen so that the image to image variations are due to noise in the image acquisition and not due to the presence of the contrast agent or some other variation in the images such as patient motions. The joint histogram is used to determine the conditional probability density function (PDF):

$$P_{I_2|I_1}(I_2[\overline{T}_2(x_i)] = v_2 \mid I_1[\overline{T}_1(x_i)] = v_1).$$

The conditional standard deviation $\sigma(I_2|I_1=v_1)$ for each $v_1$, which will be denoted by the shorthand $\sigma(v_1)$, is determined from these conditional probabilities. Then, a least square affine fit may be performed to find the best estimator of $\sigma(v_1)$, $q(v_1)=a*v_1+b$. The fit is performed by using a weighting on the variance of each term based on the total number of image points with a particular intensity.

The Cusum algorithm is also modified with a second threshold to find the arrival time $n_a$ at each location using the following equation:

$$n_\alpha = \operatorname*{argmax}_{n \in [l, nj-1]} h_{n-1} < T_\alpha$$

for some threshold $T_a$. This step provides the desired N-dimensional set of arrival times $n_a[x_i]$.

Figures 7A, 7B:
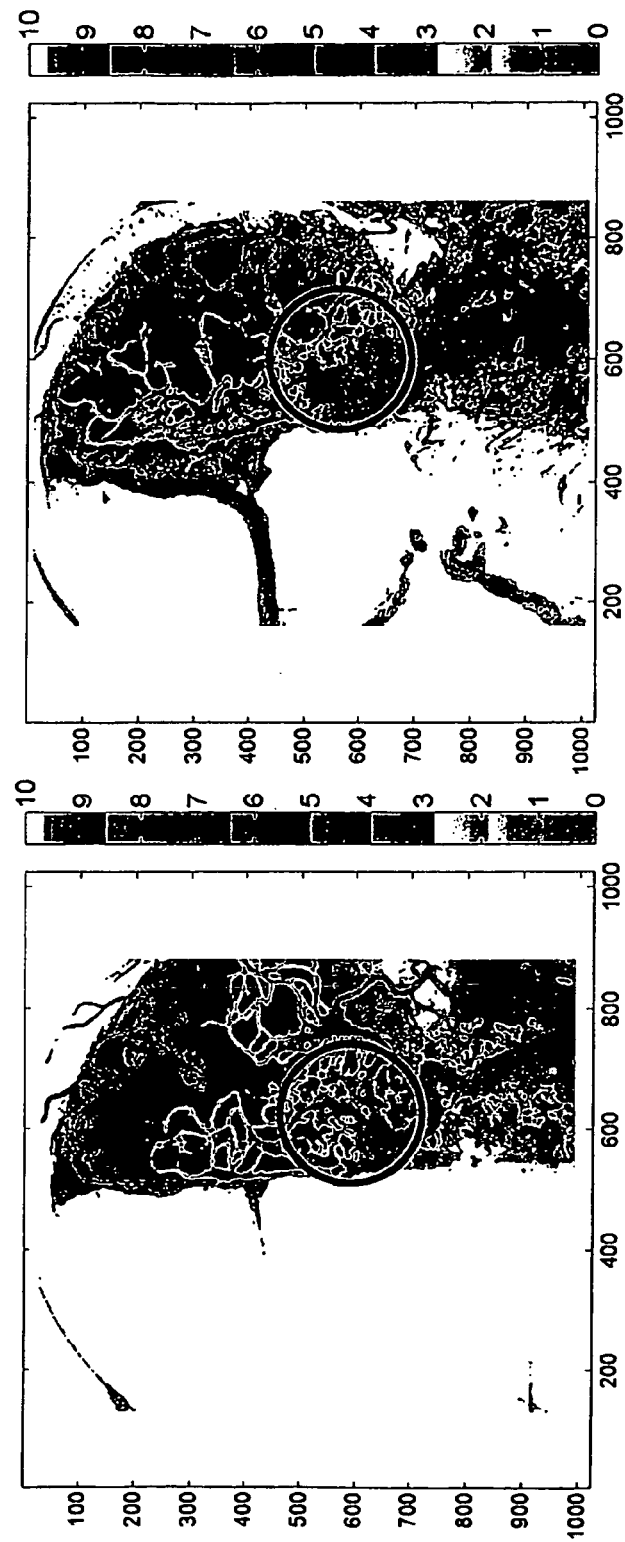
FIGS. 7a-b show an exemplary single 2D image constructed from 2D time series images using the Cusum algorithm in accordance with an embodiment of the present invention.

FIGS. 7*a*-*b* show an exemplary single 2D image constructed from 2D time series images using the Cusum algorithm in accordance with an embodiment of the present invention. As shown in FIG. 7*a*, a single image is provided with movement information (e.g., contrast arrival times) at a first time. As shown in FIG. 7*b*, a single reconstructed image is provided with movement information from a set of 2D images that include movement information. As shown, FIG. 7*b* provides a detailed illustration of the blood or fluid flow through the vessels. In particular, FIG. 7*b* includes more information about the fluid flow than FIG. 7*a* because the single 2D image combines fluid flow information over a larger time interval. A surgeon may, for example, analyze FIG. 7*b* and detect an anomaly such as a clot. A clot may be detected where fluid flow or blood flow is expected to have been shown at a particular time but is not shown by the contrast agent arrival time indication (i.e., displayed as an image intensity). For example, as shown in FIG. 7*b*, contrast agent arrival time represented in the legend as intensity number 10 means that fluid has not flowed in a long period of time or not at all detected whereas the intensity number 0 indicates that fluid has flowed most recently. Accordingly, the circled region in FIG. 7*b*, indicates a region where fluid flow has been expected to be a low intensity value (indicating a flow at a recent time period), for example, 4 but is actually a high intensity value (indicating a flow at an earlier time period), for example, 7 indicating the lack of fluid flow in a period of time.

It should be understood, that FIGS. 7*a* and 7*b* may be generated by projecting a cross-section or focusing on a particular region of M-dimensional time series images 420 (FIG. 4) (e.g., 3D time series images) constructed using data fusion process 130.

Figure 8:
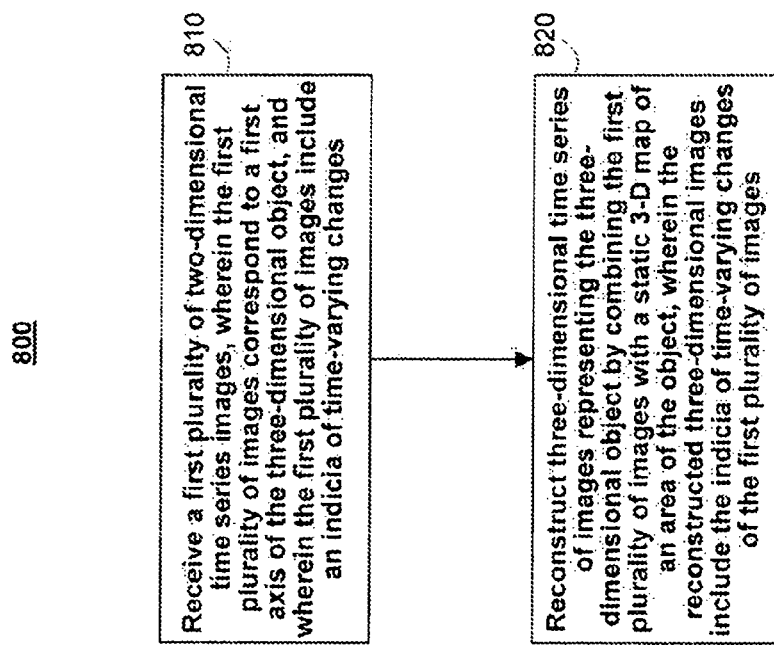
FIG. 8 illustrates a method of constructing 3D time series images in accordance with an embodiment of the present invention.

FIG. 8 illustrates a method 800 of constructing 3D time series images in accordance with an embodiment of the present invention. At step 810, a first plurality of 2D time series images are received. The first plurality of images correspond to a first axis of the 3D object and the first plurality of images include an indicia of time varying changes. For example, as shown in FIGS. 1 and 2, N-dimensional time series images 110*a*-*n* are received. N-dimensional time series images 110*a*-*n* may be generated using an X-ray imager, angiography imaging device or any other imager that may produce an N-dimensional image that includes an indicia of time varying changes.

At step 820, 3D time series of images representing the 3D object are reconstructed by combining the first plurality of images with a static 3D map of a region of the object. The reconstructed 3D images includes the indicia of time varying changes of the first plurality of images. For example, N-dimensional time series images 110 and M-dimensional static map 120 may be received by data fusion process 130 (FIG. 1). Data fusion processing circuitry may operate on the data input in accordance with function 500 (FIG. 5). Data fusion process 130 outputs M-dimensional images 420*a*-*d* that include indicia of time varying changes (FIG. 4).

Figure 9:
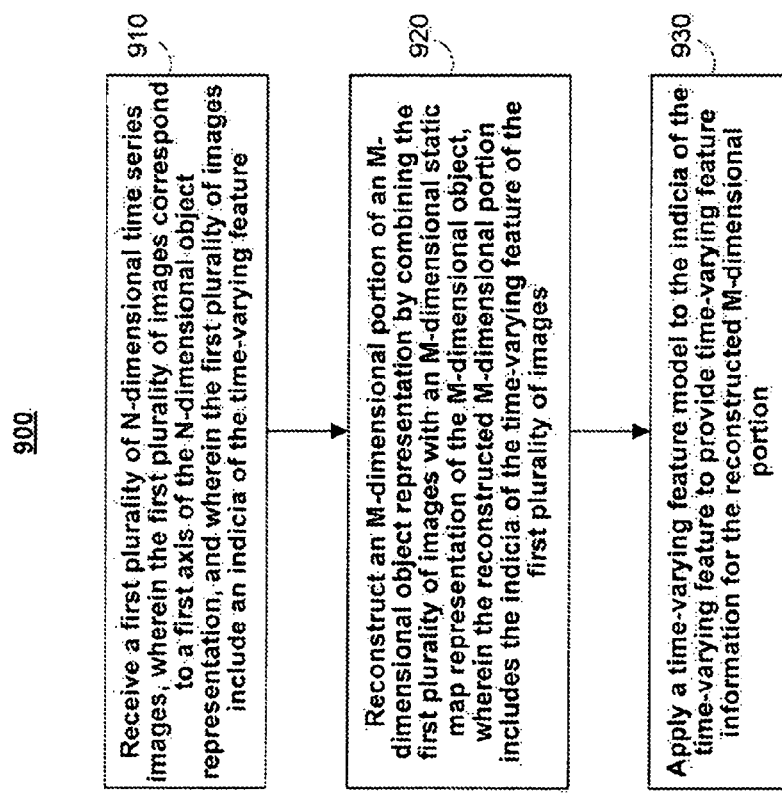
FIG. 9 illustrates a method of constructing an N-dimensional portion of an N-dimensional object representation that includes time-varying features in accordance with an embodiment of the present invention.

FIG. 9 illustrates a method 900 of constructing an N-dimensional portion of an N-dimensional object representation that includes time-varying features in accordance with an embodiment of the present invention. At step 910, a first plurality of M-dimensional time series images are received. The first plurality of images correspond to a first axis of the N-dimensional object and the first plurality of images include an indicia of time varying feature. For example, as shown in FIGS. 1 and 2, N-dimensional time series images 110*a*-*n* are received. N-dimensional time series images 110*a*-*n* may be generated using an X-ray imager, angiography imaging device or any other imager that may produce an N-dimensional image that includes an indicia of time varying changes.

At step 920, M-dimensional portion of an M-dimensional object representation is reconstructed by combining the first plurality of images with a static M-dimensional map of a region of the object. The reconstructed M-dimensional images includes the indicia of time varying feature of the first plurality of images. For example, N-dimensional time series images 110 and M-dimensional static map 120 is received by data fusion process 130 (FIG. 1). Data fusion processing circuitry may operate on the data input in accordance with function 500 (FIG. 5). Data fusion process 130 outputs M-dimensional images 420*a*-*d* that include indicia of time varying changes (FIG. 4).

At step 930, a time-varying feature model is applied to the indicia of the time-varying feature to provide time-varying feature information for the reconstructed M-dimensional portion. For example, model 140 may be applied to data fusion process 130 to provide information about the time-varying feature such as the position in relation to time of the time-varying feature (FIG. 1).

Figure 10:
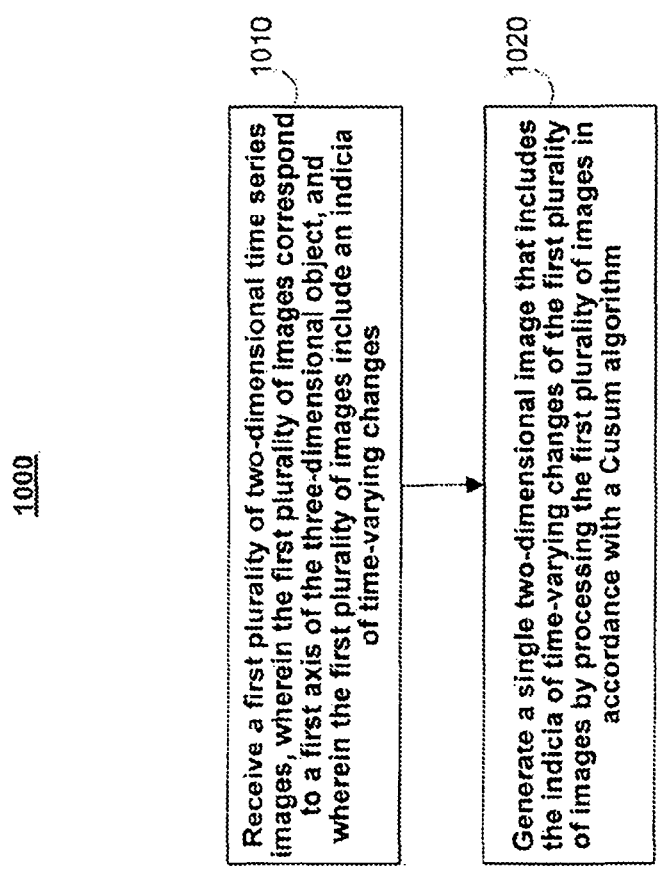
FIG. 10 illustrates a method of generating a single 2D image that includes indicia of time varying changes in accordance with an embodiment of the present invention.

FIG. 10 illustrates a method 1000 of generating a single 2D image that includes indicia of time varying changes in accordance with an embodiment of the present invention. At step 1010, a first plurality of 2D time series images are received. The first plurality of images correspond to a first axis of the 3D object and the first plurality of images include an indicia of time varying changes. For example, as shown in FIGS. 1 and 2, N-dimensional time series images 110*a*-*n* are received. N-dimensional time series images 110*a*-*n* may be generated using an X-ray imager, angiography imaging device or any other imager that may produce an N-dimensional image that includes an indicia of time varying changes.

At step 1020, a single 2D image are generated that includes the indicia of time varying changes of the first plurality of images by processing the first plurality of images in accordance with a Cusum algorithm. For example, FIG. 7*b* shows a single 2D image that was generated that includes contrast information indicating the location of a fluid such as blood in vessels in relation to time. The change in contrast indicates the arrival time of the fluid as indicated by the plurality of images that are received.

It should be understood that the M-dimensional time series images may be used in various applications not limited to surgical operations on a patient. For example, in one application, the M-dimensional static map represents a circuit and its various components and the N-dimensional time series represent heat dissipation or current flow through the circuit. Fusing the N-dimensional time series with the M-dimensional map of the circuit enables easier analysis of circuit behavior. In particular, while the N-dimensional time series indicate the heat dissipation or current flow in one region of the circuit, the reconstructed M-dimensional time series provides heat dissipation or current flow information about a different region of the circuit. Another application, may be in the realm of a machines such as automobiles or engines. In such applications, the M-dimensional static map represents the machine at steady state and the N-dimensional time series images represent the active machine and include, for example, heat dissipation information.

Additionally, in the realm of surgical operations, the fused data producing the M-dimensional time series information may be analyzed with other patients' information or information known about the general population to detect anomalies. For example, fluid or blood flow in a particular region may generally be known to have a particular behavior in the general population. The information may be compared against the fused M-dimensional time series to determine whether the fused M-dimensional time series follows the general population pattern. A region of the fused M-dimensional time series that may deviate from what is known about the general population may thus be detected (by a computer doing the comparison/analysis or a human) and appropriate remedies may be given.

As discussed above, the invention may be applied to an N-dimensional time series and M-dimensional static map, where N is less than M. FIG. 11 shows a system in accordance with this invention that fuses N-dimensional time series images with an M-dimensional static map.

Figure 11:
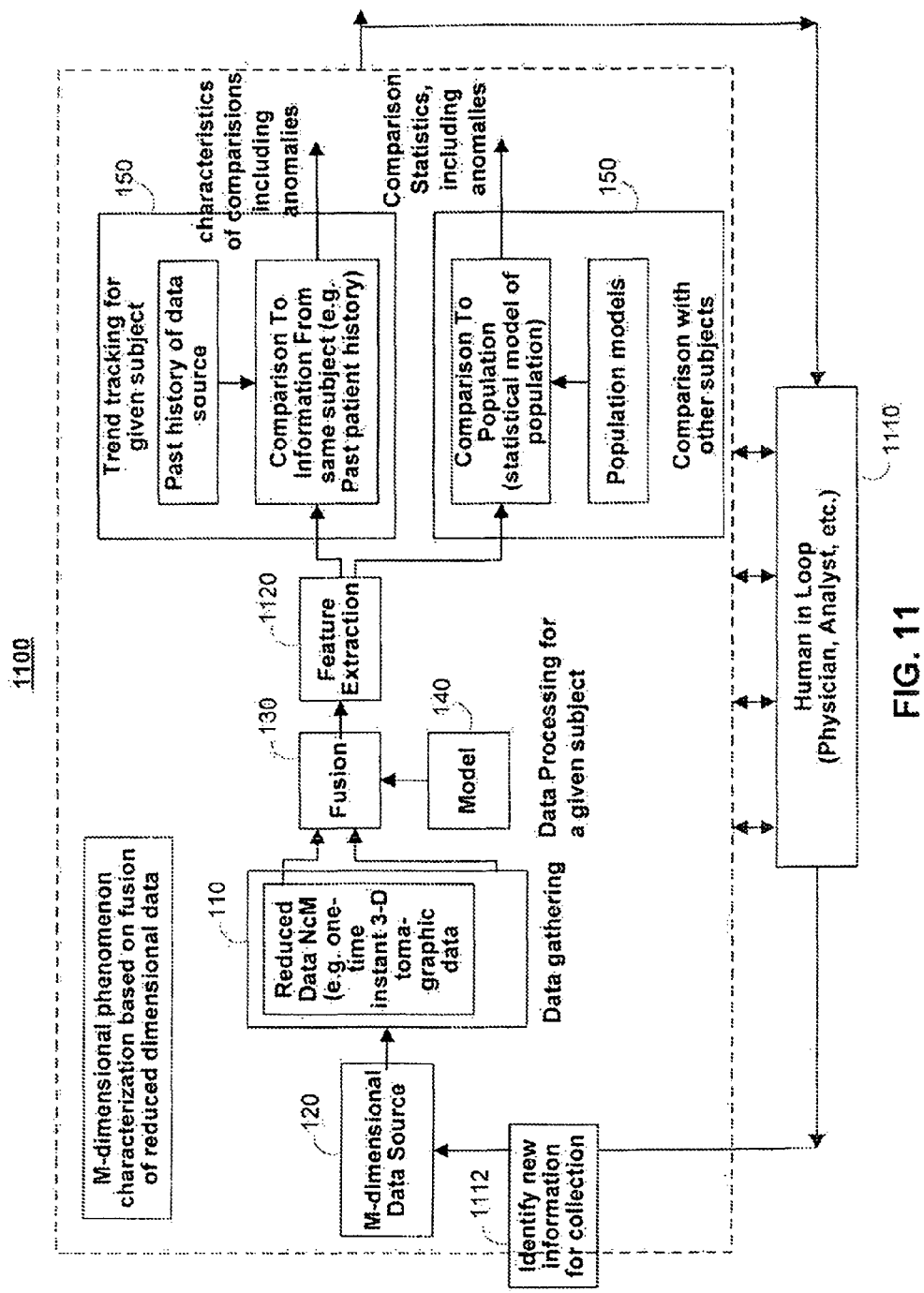
FIG. 11 is a diagram of an illustrative data fusion process with a feedback loop in accordance with an embodiment of the present invention in accordance with an embodiment of the present invention.

FIG. 11 is a diagram of an illustrative data fusion process 1100 with a feedback loop in accordance with an embodiment of the present invention in accordance with an embodiment of the present invention. Data fusion process 1100 is similar to data fusion process 100 (FIG. 1) and is similarly labeled. As shown in FIG. 11, data fusion process 1100 includes a feature extraction module 1120 and a feedback loop 1110 that may include a human analyzing the M-dimensional time series.

Feature extraction module 1120 extracts information that corresponds to a particular region in the combined M-dimensional time series. The extracted features are provided to computation modules 150 for further analysis. For example, the features may be compared with information specific to the object of interest such as, a circuit. Alternatively, the extracted features may be compared with information that is more generalized to the class of objects related to the object being analyzed. Statistical models may be applied in modules 150 to detect anomalies or ailments in the object of interest.

The information provided by modules 150 is analyzed by a human in feedback loop 1110. In particular, the human or analyst interprets the information and identify new information for collection 1112. New information for collection 1112 may be a new region of interest of the M-dimensional time series images. The human inputs this information and a new set of N-dimensional time series images 110 is collected that corresponds to the new region of interest. The new region of interest is fused with M-dimensional static map 120 by fusion process 130 and the output is compared or analyzed by modules 150.

The above described embodiments of the present invention are presented for purposes of illustration and not of limitation, and the present invention is limited only by the claims which follow.

What is claimed is:

1. A method for producing an M-dimensional object representation that includes time-varying feature information using N-dimensional images, where the N-dimension of the images is of lower dimension than the M-dimension of the object representation, the method comprising:
   receiving, by a processor, a first plurality of N-dimensional time series images, wherein the first plurality of images correspond to a first axis of the M-dimensional object representation, and wherein the first plurality of images include an indicia of the time varying feature;
   reconstructing, by the processor, an M-dimensional portion of the M-dimensional object representation by combining the first plurality of images with an M-dimensional static map representation of the M-dimensional object, wherein the reconstructed M-dimensional portion includes the indicia of the time-varying feature of the first plurality of images; and
   applying, by the processor, a time-varying feature model to the indicia of the time-varying feature to provide time-varying feature information for the reconstructed M-dimensional portion.

2. The method of claim 1 further comprising receiving, by the processor, a second plurality of N-dimensional time series of the M-dimensional object representation, and wherein the second plurality of images include an indicia of the time-varying feature.

3. The method of claim 1 wherein:
   the M-dimensional object is a circuit; and
   the time-varying feature is dissipated heat or current flow.

4. The method of claim 1 wherein:
   the M-dimensional object representation is a three-dimensional representation of a living object;
   the first plurality of N-dimensional images are two-dimensional image representations of the living object; and
   the time-varying feature includes fluid flow information through the living object.

5. The method of claim 1 further comprising registering, by the processor, the first plurality of images, wherein the registering aligns each of the images in the first plurality of images relative to each other.

6. The method of claim 5 wherein the registering comprises:
   processing, by the processor, a first and a second image of the first plurality of images to find a representative value, wherein the representative value is a mean value, a median value or an entropy value;
   aligning, by the processor, the representative value with a third image of the first plurality of images to produce a representative image of the first, second and third images; and
   repeating, by the processor, the processing and the aligning with a representative image for every image in the first plurality of images to produce a representative image of the first plurality of images.

7. The method of claim 1 further comprising:
   receiving, by the processor, M-dimensional orientation information; and
   mapping, by the processor, the first plurality of images to the M-dimensional map by applying the orientation information to the first plurality of images to determine which portion of the first plurality of images corresponds to the M-dimensional map.

8. The method of claim 7 wherein:
   the reconstructed M-dimensional portion includes ambiguities; and
   the mapping removes the ambiguities present in the M-dimensional portion to produce an accurate representation of the M-dimensional object.

9. A system for producing an M-dimensional object representation that includes time-varying feature information using N-dimensional images, where the N-dimension of the images is of lower dimension than the M-dimension of the object representation, the system comprising:
   a processor operable to:
      receive a first plurality of N-dimensional time series images, wherein the first plurality of images correspond to a first axis of the M-dimensional object representation, and wherein the first plurality of images include an indicia of the time varying feature;
      reconstruct an M-dimensional portion of the M-dimensional object representation by combining the first plurality of images with an M-dimensional static map representation of the M-dimensional object, wherein the reconstructed M-dimensional portion includes the indicia of the time-varying feature of the first plurality of images; and
      apply a time-varying feature model to the indicia of the time-varying feature to provide time-varying feature information for the reconstructed M-dimensional portion.

10. The system of claim 9 wherein the processor is further operable to register the first plurality of images, wherein the registering aligns each of the images in the first plurality of images relative to each other.

11. The system of claim 10 wherein the registering comprises:
   processing a first and a second image of the first plurality of images to find a representative value, wherein the representative value is a mean value, a median value or an entropy value;
   aligning the representative value with a third image of the first plurality of images to produce a representative image of the first, second and third images; and
   repeating the processing and the aligning with a representative image for every image in the first plurality of images to produce a representative image of the first plurality of images.

12. The system of claim 9 wherein the processor is further operable to:
   receive M-dimensional orientation information; and
   map the first plurality of images to the M-dimensional map by applying the orientation information to the first plurality of images to determine which portion of the first plurality of images corresponds to the M-dimensional map.

13. The system of claim 12 wherein:
   the reconstructed M-dimensional portion includes ambiguities; and
   the mapping removes the ambiguities present in the M-dimensional portion to produce an accurate representation of the M-dimensional object.

14. A non-transitory computer readable medium having computer readable program codes embodied therein for producing an M-dimensional object representation that includes time-varying feature information using N-dimensional images, where the N-dimension of the images is of lower dimension than the M-dimension of the object representation, the computer readable medium program code, when executed by a processor causes the processor to:

receive a first plurality of N-dimensional time series images, wherein the first plurality of images correspond to a first axis of the M-dimensional object representation, and wherein the first plurality of images include an indicia of the time-varying feature;

reconstruct an M-dimensional portion of the M-dimensional object representation by combining the first plurality of images with an M-dimensional static map representation of the M-dimensional object, wherein the reconstructed M-dimensional portion includes the indicia of the time-varying feature of the first plurality of images; and apply a time-varying feature model to the indicia of the time-varying feature to provide time-varying feature information for the reconstructed M-dimensional portion.

15. The non-transitory computer readable medium of claim 14 wherein the computer readable program code, when executed by the processor further causes the processor to register the first plurality of images, wherein the registering aligns each of the images in the first plurality of images relative to each other.

16. The non-transitory computer readable medium of claim 15 wherein the registering comprises:

processing a first and a second image of the first plurality of images to find a representative value, wherein the representative value is a mean value, a median value or an entropy value;

aligning the representative value with a third image of the first plurality of images to produce a representative image of the first, second and third images; and repeating the processing and the aligning with a representative image for every image in the first plurality of images to produce a representative image of the first plurality of images.

17. The non-transitory computer readable medium of claim 14 wherein the computer readable program code, when executed by the processor further causes the processor to:

receive M-dimensional orientation information; and map the first plurality of images to the M-dimensional map by applying the orientation information to the first plurality of images to determine which portion of the first plurality of images corresponds to the M-dimensional map.

18. The non-transitory computer readable medium of claim 17 wherein:

the reconstructed M-dimensional portion includes ambiguities; and the mapping removes the ambiguities present in the M-dimensional portion to produce an accurate representation of the M-dimensional object.

* * * * *